US012717257B2

(12) United States Patent
Watanabe et al.

(10) Patent No.: US 12,717,257 B2
(45) Date of Patent: Aug. 25, 2026

(54) IMAGE FORMING APPARATUS, IMAGE FORMING METHOD, AND STORAGE MEDIUM

(71) Applicant: Konica Minolta, Inc., Tokyo (JP)

(72) Inventors: Wataru Watanabe, Hachioji (JP); Tomo Kitada, Yokohama (JP); Keiki Katsumata, Hachioji (JP); Kei Okamura, Yokohama (JP); Tomohiro Mikami, Mitaka (JP); Miyuki Katou, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/984,504

(22) Filed: Dec. 17, 2024

(65) Prior Publication Data

US 2025/0208554 A1 Jun. 26, 2025

(30) Foreign Application Priority Data

Dec. 26, 2023 (JP) ................................ 2023-218826

(51) Int. Cl.
*G03G 15/00* (2006.01)

(52) U.S. Cl.
CPC ..... *G03G 15/5062* (2013.01); *G03G 15/5075* (2013.01); *G03G 15/6588* (2013.01); *G03G 2215/00717* (2013.01)

(58) Field of Classification Search
CPC .......... G03G 15/5062; G03G 15/5075; G03G 15/6588
See application file for complete search history.

(56) References Cited

U.S. PATENT DOCUMENTS 8,320,781 B2 * 11/2012 Muto ................ G03G 15/5041 399/72
8,532,509 B2 * 9/2013 Yashima ............. G03G 15/161 399/72
2015/0071671 A1 * 3/2015 Kiuchi ................ G03G 15/652 399/72

FOREIGN PATENT DOCUMENTS

JP 2021-165813 A 10/2021

* cited by examiner

*Primary Examiner* — Hoang X Ngo
(74) *Attorney, Agent, or Firm* — LUCAS & MERCANTI, LLP

(57) ABSTRACT

An image forming apparatus includes: an image former that forms an image on a recording medium that includes unevenness on a surface thereof; a reader that reads a pattern image formed on the recording medium by the image former; and a hardware processor. The hardware processor acquires, before formation of the pattern image on the recording medium, unevenness information regarding an amount of unevenness on an image forming surface of the recording medium. Based on the unevenness information, the hardware processor sets a pattern image forming position satisfying a predetermined condition, and adjusts an operation of forming the pattern image performed by the image former.

15 Claims, 8 Drawing Sheets

IMAGE FORMING APPARATUS, IMAGE FORMING METHOD, AND STORAGE MEDIUM

CROSS-REFERENCE TO RELATED APPLICATIONS

The entire disclosure of Japanese Patent Application No. 2023-218826, filed on Dec. 26, 2023, is incorporated herein by reference in its entirety.

BACKGROUND OF THE INVENTION

Technical Field

The present invention relates to an image forming apparatus, an image forming method, and a storage medium.

Description of Related Art

Conventionally, an image forming apparatus using an electrophotographic process technology has been known. In the image forming apparatus, an electrostatic latent image is formed by irradiating a charged photoreceptor with laser light based on image data. Next, toner is supplied from a developing device to a photosensitive drum on which an electrostatic latent image is formed, to visualize the electrostatic latent image and form a toner image. Next, the formed toner image is transferred onto a sheet, and then the toner image is heated and pressurized to be fixed onto a recording medium, thereby forming an image.

In such image forming apparatus, a pattern image for image quality stabilization is formed on the recording medium, the pattern image is read by a sensor to acquire a state of the apparatus, and image forming conditions are adjusted. However, for example, in a case where the recording medium has unevenness and the height is uneven, such as a case where the recording medium is an embossed sheet, the state of the apparatus might not be accurately acquired due to the influence of the unevenness.

A specific example is illustrated in FIG. 9A and FIG. 9C. FIG. 9A is a graph illustrating a reading result by a sensor when a pattern image is formed on smooth sheet. FIG. 9C is a graph illustrating the reading result by the sensor when the pattern image similar to that in FIG. 9A is formed at the position of the embossed sheet illustrated in FIG. 9B. Note that in FIG. 9A and FIG. 9C, a horizontal axis represents conveyance time and a vertical axis represents an output value of the sensor that has read the pattern image (i.e., image density). In FIG. 9B, the horizontal axis represents the length of the recording medium in the conveyance direction and the vertical axis represents the height of the recording medium (i.e., amount of embossing). From a comparison between FIG. 9A and FIG. 9C, it is understood that when a pattern image is formed over portions having different heights such as embossed portions, a variation occurs in a reading result of the sensor.

Therefore, for example, Japanese Unexamined Patent Publication No. 2021-165813 describes an image forming apparatus that, based on thicknesses of recording media having embossed portions and depths of the embossed portions, identifies regions where image disturbance occurs and its level of occurrence, and corrects the disturbance.

However, the invention of Japanese Unexamined Patent Publication No. 2021-165813 is an invention for calculating an estimated value by multiplying a measurement result by a value of a prescribed correction table, and does not guarantee a highly accurate measurement result.

SUMMARY OF THE INVENTION

The present invention has been made in view of such circumstances. It is an object of the present invention to provide an image forming apparatus, an image forming method, and a storage medium which are capable of performing pattern measurement with higher accuracy even on a recording medium having unevenness.

To achieve at least one of the abovementioned objects, according to an aspect of the present invention, an image forming apparatus reflecting one aspect of the present invention includes an image former that forms an image on a recording medium that includes unevenness on a surface thereof; a reader that reads a pattern image formed on the recording medium by the image former; and a hardware processor, wherein the hardware processor acquires, before formation of the pattern image on the recording medium, unevenness information regarding an amount of unevenness on an image forming surface of the recording medium, and wherein, based on the unevenness information, the hardware processor sets a pattern image forming position satisfying a predetermined condition, and adjusts an operation of forming the pattern image performed by the image former.

According to another aspect of the present invention, an image forming method reflecting one aspect of the present invention is an image forming method performed in an image forming apparatus including, an image former that forms an image on a recording medium that includes unevenness on a surface thereof, and a reader that reads a pattern image formed on the recording medium by the image former, the image forming method including: acquiring, before formation of the pattern image on the recording medium, unevenness information including an amount and a position of unevenness on an image forming surface of the recording medium; and based on the unevenness information, setting a pattern image forming position satisfying a predetermined condition, and adjusting an operation of forming the pattern image performed by the image former.

According to another aspect of the present invention, a storage medium reflecting one aspect of the present invention is a non-transitory computer-readable storage medium storing a program that causes a computer of an image forming apparatus including an image former that forms an image on a recording medium that includes unevenness on a surface thereof, and a reader that reads a pattern image formed on the recording medium by the image former to perform: acquiring, before formation of the pattern image on the recording medium, unevenness information including an amount and a position of unevenness on an image forming surface of the recording medium; and based on the unevenness information, setting a pattern image forming position satisfying a predetermined condition, and adjusting an operation of forming the pattern image performed by the image former.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Figure 1:
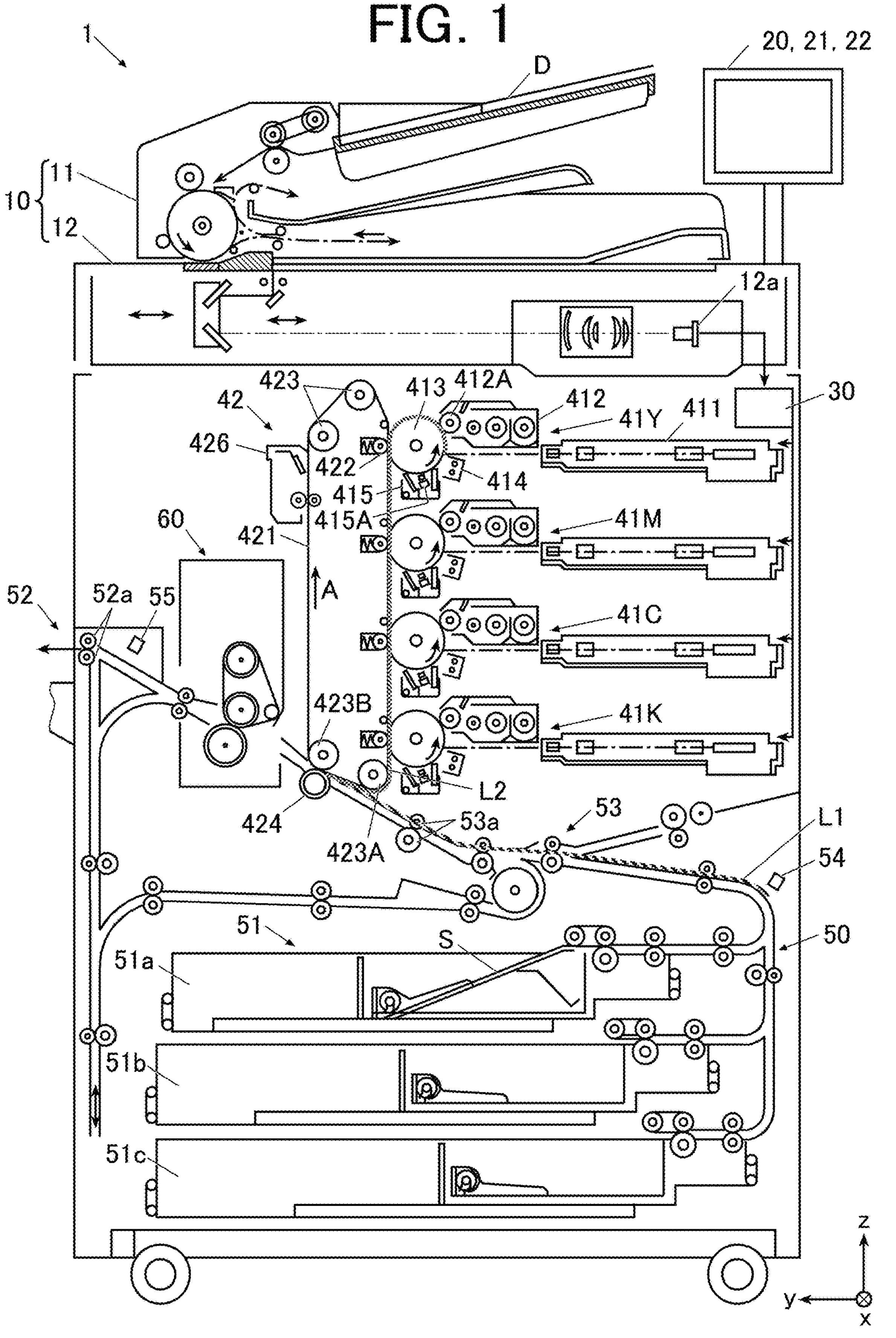
FIG. 1 is an overall side cross-sectional view of an image forming apparatus.

Hereinafter, one or more embodiments of the present invention will be described with reference to the drawings. However, the scope of the invention is not limited to the disclosed embodiments.

Hereinafter, an image forming apparatus according to an embodiment of the present invention will be described in detail with reference to the drawings. However, the scope of the invention is not limited to the illustrated examples. In the following description, components having the same functions and configurations are denoted by the same reference numerals, and the description thereof will be omitted.

[Overall Configuration of Image Forming Apparatus]

Figure 2:
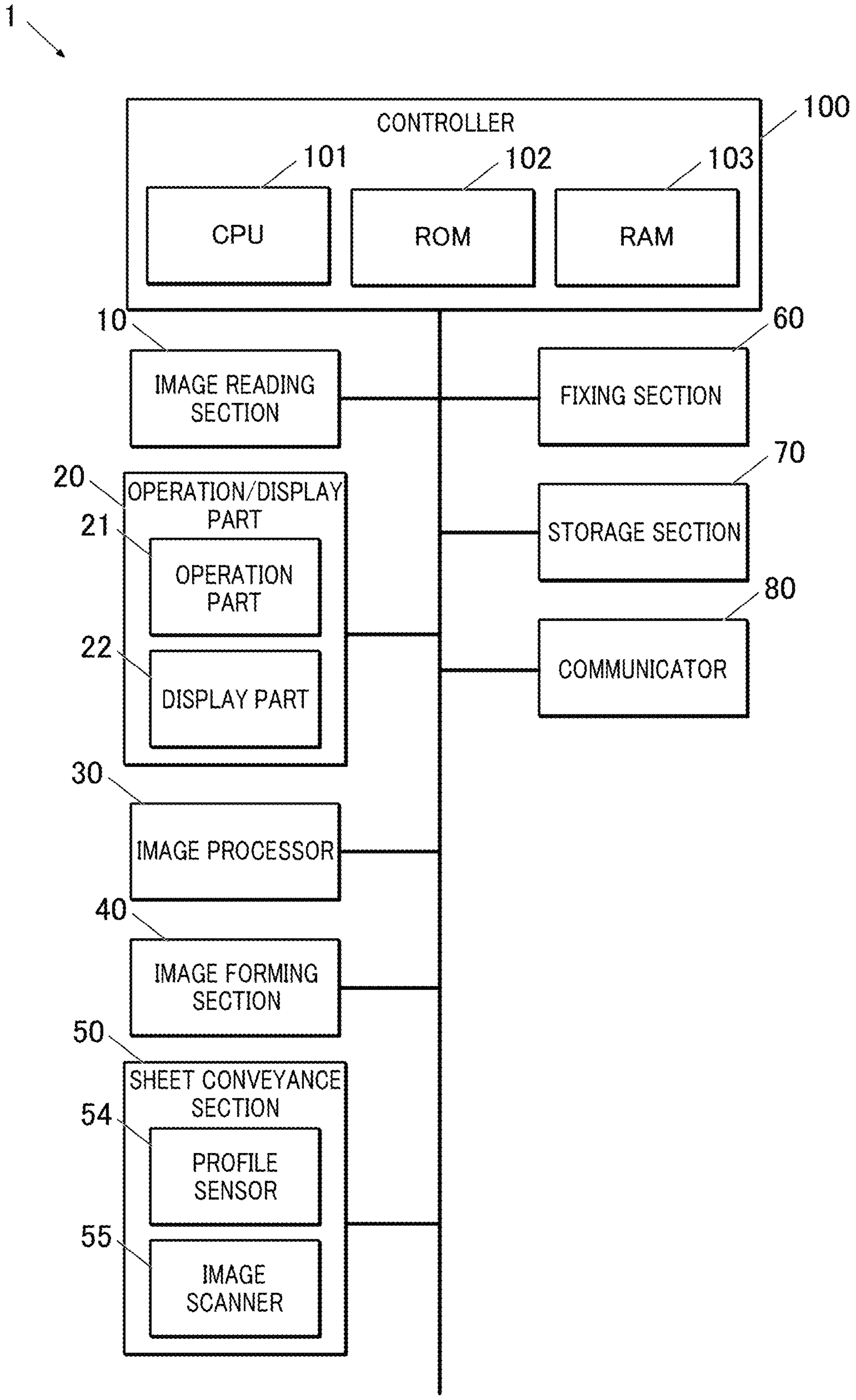
FIG. 2 is a block diagram of the image forming apparatus.

FIG. 1 is a schematic diagram illustrating an overall configuration of an image forming apparatus 1. FIG. 2 is a block diagram illustrating a main functional configuration of the image forming apparatus 1. The image forming apparatus 1 includes an image reading section 10, an operation/display part 20, an image processor 30, an image forming section (image former) 40, a sheet conveyance section 50, a fixing section 60, a storage section (storage) 70, a communicator 80, and a controller 100 (hardware processor).

Hereinafter, an X direction, a Y direction, and a Z direction refer to the directions illustrated in FIG. 1. Further, in the description below, the X direction, the Y direction, and the Z direction correspond to a width direction, a conveyance direction, and a height direction, respectively.

The image forming apparatus 1 is a color image forming apparatus utilizing an electrophotographic process technology. That is, the image forming apparatus 1 primarily transfers the toner images of respective colors of yellow (Y), magenta (M), cyan (C), and black (K) formed on respective photosensitive drums 413 onto an intermediate transfer belt 421. Next, the image forming apparatus 1 superimposes the toner images in four colors on the intermediate transfer belt 421, and then secondarily transfers the images onto a sheet (recording medium) S, thereby forming an image.

The image forming apparatus 1 employs a tandem system. Specifically, in the image forming apparatus 1, the photosensitive drums 413 corresponding to four colors of YMCK are arranged in series in a moving direction of the intermediate transfer belt 421. Then, the image forming apparatus 1 sequentially transfers each color toner image to the intermediate transfer belt 421.

(Controller)

The controller 100 includes a central processing unit (CPU) 101, a read only memory (ROM) 102, a random access memory (RAM) 103, and the like. The CPU 101 reads a program corresponding to processing contents from the ROM 102 and develops the program in the RAM 103. Then, the CPU 101 cooperates with the developed program to centrally control the operation of each part of the image forming apparatus 1.

(Image Reading Section)

The image reading section 10 includes an automatic document sheet feed device 11, a document image scanning device 12, and the like.

{Automatic Document Sheet Feed Device}

The automatic document sheet feed device 11 is referred to as an auto document feeder (ADF). The automatic document sheet feed device 11 conveys a document D placed on a document tray by a conveyance mechanism and sends the document to the document image scanning device 12. The automatic document sheet feed device 11 can continuously and collectively read images on both faces of a large number of documents D placed on the document tray.

{Document Image Scanning Device}

The image scanning device 12 is, for example, a scanner. The document image scanning device 12 optically scans the document conveyed from the automatic document sheet feed device 11 onto a contact glass or the document placed on the contact glass. Then, the document image scanning device 12 forms an image according to reflected light from the document on a light receiving surface of a charge coupled device (CCD) sensor 12*a* to read a document image. The image reading section 10 generates input image data based on a result of reading by the document image scanning device 12. The input image data undergoes predetermined image processing in the image processor 30.

(Operation/Display Part)

The operation/display part 20 is composed of, for example, a liquid crystal display (LCD) with a touch screen. The operation/display part 20 functions as a display part 21 and an operation part 22.

{Display Part}

The display part 21 displays various operation screens, a state of an image, an operation status of each function, or the like in accordance with a display control signal input from the controller 100.

{Operation Part}

The operation part 22 includes various operation keys such as a numeric keypad and a start key. The operation part 22 accepts various kinds of input operation by a user, and outputs an operation signal to the controller 100.

(Image Processor)

The image processor 30 includes a circuit and the like that applies digital image processing to input image data in accordance with initial settings or user settings. For example, the image processor 30 applies tone correction on the basis of tone correction data (tone correction table) under the control of the controller 100. The image processor 30 also applies, to the image data, various kinds of correction processing such as color correction and shading correction, compression processing, and the like. The processed image data is input to the image forming section 40.

(Image Forming Section)

The image forming section 40 includes image forming units 41Y, 41M, 41C, and 41K, an intermediate transfer unit 42, and the like.

{Image Forming Unit}

The image forming units 41Y, 41M, 41C, and 41K form images with color toners of Y, M, C, and K components, respectively, based on input image data. The image forming units 41Y, 41M, 41C, and 41K have the same configuration. Therefore, for the purpose of illustration and description, common constituent elements are denoted by the same reference numerals, and when the constituent elements are distinguished from each other, Y, M, C, or K is added to the reference numerals. In FIG. 1, reference numerals are only provided to the constituent elements of the image forming unit 41Y for the Y components and the reference numbers of the constituent elements of the other image forming units 41M, 41C, 41K are omitted.

The image forming unit 41 includes an exposure device 411, a developing device 412, a photosensitive drum 413, a charging device 414, and a drum cleaning device 415. Each of the devices constituting the image forming unit 41 has its axial direction in the width direction.

[Exposure Device]

The exposure device 411 is composed of, for example, a semiconductor laser. The exposure device 411 scans and exposes the charged photosensitive drum 413 to form a latent image.

[Developing Device]

The developing device 412 employs a two-component developing method. The developing device 412 visualizes the electrostatic latent image by attaching the toner of each color component to the surface of the photosensitive drum 413 to form the toner image. The developing roller 412A included in the developing device 412 carries the developer while rotating, and supplies the toner contained in the developer to the photosensitive drum 413, thereby forming the toner image on a surface of the photosensitive drum 413.

[Photosensitive Drum]

The photosensitive drum 413 is, for example, a conductive cylindrical body (aluminum tube) made of aluminum and having a drum diameter of 80 mm. The photosensitive drum 413 is an organic photoreceptor (OPC, organic photoconductor) of a negative charging type. In the photosensitive drum 413, an under coat layer (UCL), a charge generation layer (CGL), and a charge transport layer (CTL) are sequentially laminated on a circumferential surface of the cylindrical body.

The controller 100 controls a driving current supplied to a drive motor (not illustrated) that rotates the photosensitive drum 413, thereby rotating the photosensitive drum 413 at a constant circumferential speed.

[Charging Device]

The charging device 414 uniformly charges a surface of the photosensitive drum 413 having photoconductivity to a negative polarity.

[Drum Cleaning Device]

The drum cleaning device 415 includes a drum cleaning blade and a lubricant application brush 415A. The drum cleaning device 415 removes residual toner that is not transferred and that remains on the surface of the photosensitive drum 413 after the primary transfer. The drum cleaning blade is brought into sliding contact with the surface of the photosensitive drum 413. The lubricant application brush 415A applies a lubricant to the photosensitive drum 413 for the purpose of enhancing releasability of the toner from the photosensitive drum 413 and suppressing wear of photosensitive film thickness.

(Intermediate Transfer Unit)

The intermediate transfer unit 42 includes an intermediate transfer belt 421, a primary transfer roller 422, a plurality of support rollers 423, a secondary transfer roller 424, and a belt cleaning device 426.

[Intermediate Transfer Belt]

The intermediate transfer belt 421 is formed with an endless belt and stretched in a loop around the plurality of support rollers 423. At least one of the plurality of support rollers 423 is constituted by a driving roller, and the others are constituted by driven rollers. In particular, the roller 423A disposed on the downstream side of the primary transfer roller 422 for the K-component in the belt moving direction is preferably the driving roller. This allows moving speed of the belt in a primary transfer section to be easily kept constant. The rotation of the drive roller 423A causes the intermediate transfer belt 421 to move in a direction of an arrow A at a constant speed.

[Primary Transfer Roller]

The primary transfer roller 422 is arranged on a side facing an inner peripheral surface side of the intermediate transfer belt 421 in a manner facing the photosensitive drum 413 of each color component. The primary transfer roller 422 is brought into pressure contact with the photosensitive drum 413 with the intermediate transfer belt 421 interposed therebetween, thereby forming a primary transfer nip for transferring the toner image from the photosensitive drum 413 to the intermediate transfer belt 421.

[Secondary Transfer Roller]

The secondary transfer roller 424 is disposed on a side facing an outer peripheral surface side of the intermediate transfer belt 421 so as to face the backup roller 423B disposed on the downstream side of the driving roller 423A in the belt moving direction. The secondary transfer roller 424 is pressed against and brought into contact with the backup roller 423B with the intermediate transfer belt 421 interposed therebetween, thereby forming a secondary transfer nip for transferring the toner image from the intermediate transfer belt 421 to the sheet S.

When the intermediate transfer belt 421 passes through each of the primary transfer nips, the toner image on each of the respective photosensitive drums 413 is sequentially superimposed and primary transferred onto the intermediate transfer belt 421. Specifically, a primary transfer bias is applied to the primary transfer roller 422 to provide the back surface side of the intermediate transfer belt 421 with charges having a polarity opposite to that of the toner. Through the above-described operation, the toner image is electrostatically transferred onto intermediate transfer belt 421.

Thereafter, when the sheet S passes through the secondary transfer nip, the toner images on the intermediate transfer belt 421 are secondarily transferred to the sheet S. Specifically, the toner images are electrostatically transferred to the sheet S by: applying secondary transfer bias to the secondary transfer roller 424, and applying electric charge having an opposite polarity of the toner to a back-surface side of the sheet S. The sheet S on which the toner image has been transferred is conveyed toward the fixing section 60.

[Belt Cleaning Device]

The belt cleaning device 426 includes a belt cleaning blade or the like that is in sliding contact with the surface of the intermediate transfer belt 421, and removes the residual toner that is not transferred and that remains on the surface of the intermediate transfer belt 421 after the secondary transfer. Instead of the secondary transfer roller 424, a so-called belt-type secondary transfer unit in which a secondary transfer belt is stretched in a loop shape around a plurality of support rollers including the secondary transfer roller may be employed.

(Sheet Conveyance Section)

The sheet conveyance section 50 includes a sheet feed section 51, a sheet ejection section 52, a conveyance path section 53, a profile sensor (measurer) 54, and the like. In the three sheet feed tray units 51*a* to 51*c* constituting the sheet feed section 51, the sheet S (standard sheet, special sheet, and the like) identified based on basis weight, size, and the like are accommodated for each type set in advance. The conveyance path section 53 includes a plurality of conveyance roller pairs such as a registration roller pair 53*a*.

The sheet S contained in the sheet feed tray units 51*a* to 51*c* is fed one by one from the top and are conveyed to the image forming section 40 by the conveyance path section 53. At this time, an inclination of the fed sheet S is corrected and a conveyance timing is adjusted by a registration roller section in which a registration roller pair 53*a* is arranged. Then, in the image forming section 40, the toner images on the intermediate transfer belt 421 are secondarily transferred to one surface of the sheet S collectively, and a fixing step is performed in the fixing section 60. The sheet S on which the image is formed is ejected to the outside of the apparatus by the sheet ejection section 52 having a sheet ejection roller 52*a*.

Note that the sheet S used in the present embodiment is a cut sheet with an uneven surface and thus the height is not uniform depending on the position. Specifically, the sheet S is, for example, the embossed sheet.

{Profile Sensor}

The profile sensor 54 functions as a measurer that measures the unevenness of the surface of the sheet S conveyed on the conveyance path section 53.

Figure 3A:
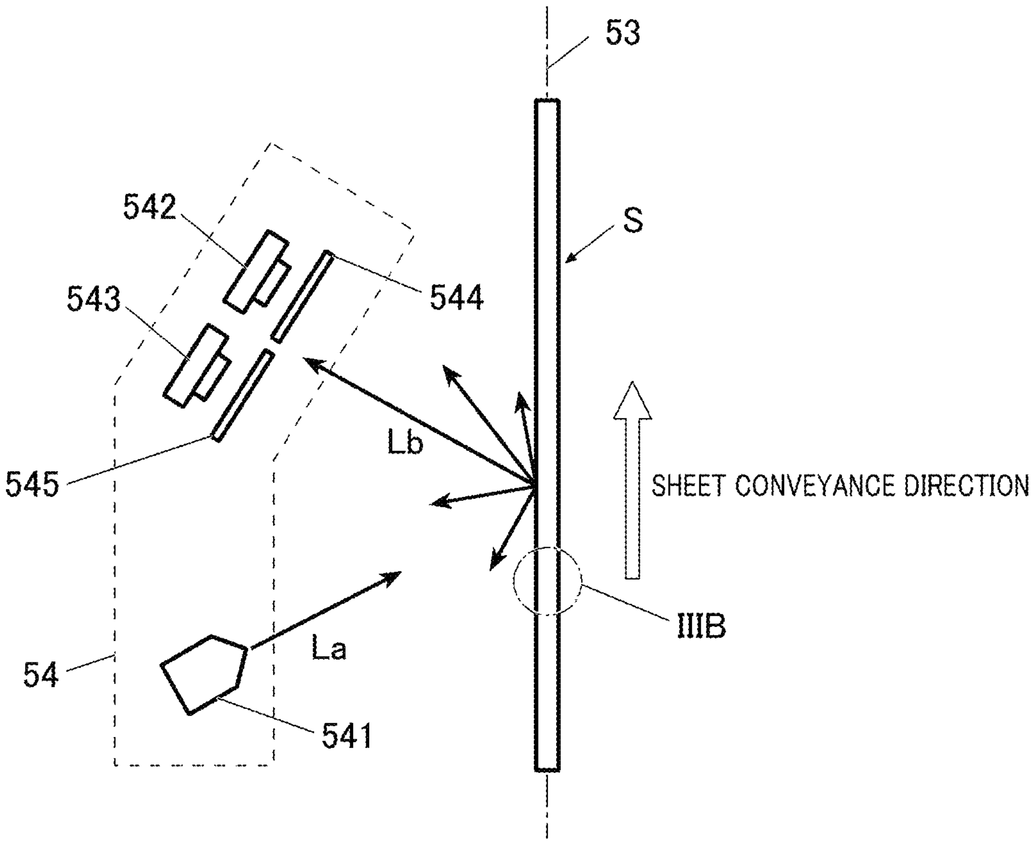
FIG. 3A is a diagram illustrating a configuration example of a profile sensor.

A schematic diagram of the profile sensor 54 is illustrated in FIG. 3A. For example, an optical sensor is used as the profile sensor 54. The profile sensor 54 irradiates the sheet S being conveyed with light La emitted from the light emitting section 541, and divides reflected light Lb from the sheet S into a P wave and an S wave by polarizing plates 544 and 545. The profile sensor 54 receives respective light beams with a light receiver 542 for the P wave and a light receiver 543 for the S wave, and outputs a signal corresponding to an amount of received light.

Figure 3B:
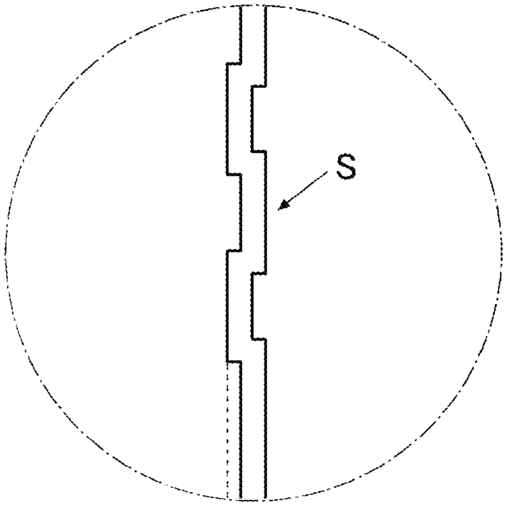
FIG. 3B is an enlarged side view of an embossed sheet.

For example, in a case where the sheet S is the smooth sheet having a smooth surface and an unevenness amount is small, a specular reflection component is increased and a diffuse reflection component is reduced. Therefore, in the smooth portion of the sheet S, generation of the P wave increases and generation of the S wave decreases. On the other hand, as illustrated in FIG. 3B, when the sheet S is the embossed sheet or the like and has the uneven surface, the specular reflection component decreases and the diffuse reflection component increases. Therefore, in a portion where the sheet S has unevenness, the generation of the P wave is reduced, and the generation of the S wave is increased.

Therefore, the storage section 70 stores in advance, on the basis of an experiment or the like, correspondence between a ratio of the amounts of received P wave and S wave and the unevenness amount of the sheet S. Then, based on the ratio of the amounts of the received P wave and S wave received from the profile sensor 54 and the above-described correlation, the controller 100 can acquire unevenness information including the amount and position of unevenness on an image forming surface of the sheet S. In this way, the controller 100 functions as an acquirer that acquires the unevenness information.

The profile sensor 54 is provided on the upstream side of the backup roller 423B and the secondary transfer roller 424 in the sheet conveyance section 50.

More specifically, as illustrated in FIG. 1, a distance from an emittance location on the sheet S by the profile sensor 54 to a secondary transfer nip of the image forming section 40 is defined as L1. Furthermore, a distance from an exposure section of the photosensitive drum 413 by the exposure device 411 to the secondary transfer nip of the image forming section 40 is defined as L2. At this time, the profile sensor 54 is provided at least at a position where L1>L2. By providing the profile sensor 54 at such position, in an image defect detection process described later, the measurement result of the profile sensor 54 can be reflected in a setting of a position where the pattern image is formed by the image forming section 40.

{Image Scanner}

In addition, an image scanner (reader) 55 is provided on a downstream side from the fixing section 60 in the sheet conveyance section 50. The image scanner 55 is, for example, a color scanner or the like, and reads the image while the sheet S is being conveyed. The image scanner 55 outputs read image data (read image) obtained by reading the image to the controller 100.

In particular, in the image defect detection process which will be described later, the image scanner 55 functions as a reading section which reads the pattern image formed on the sheet S. The image scanner 55 transmits the read image obtained by reading the pattern image to the controller 100. Then, the controller 100 calculates a read tone value (output value) from the read image. Next, the controller 100 detects the presence or absence of color misregistration or the like by comparing the calculated read tone value with a tone value stored in advance in the storage section 70.

(Fixing Section)

The fixing section 60 applies heating and pressurizing to the conveyed sheet S on which the toner images have been secondarily transferred, at the fixing nip. The fixing section 60 fixes the toner image on the sheet S through the above-described processing.

(Storage Section) The storage section 70 includes, for example, a nonvolatile semiconductor memory such as a so-called flash memory and a hard disk drive. The storage section 70 stores various types of data including various types of setting information related to the image forming apparatus 1.

For example, pattern image information is stored in the storage section 70. The pattern image information is information for forming a pattern image used for identifying the cause of an image defect in the image defect detection process described later. The pattern image information includes an elapsed time from the start of the image formation of the pattern image on the photosensitive drum 413. In addition, the pattern image information includes information indicating a correspondence relationship between a position in the width direction of the photosensitive drum 413 at which a pattern (an image portion on which the toner of the pattern image is placed) is formed at a predetermined elapsed time and an image density of the formed pattern.

(Communicator)

The communicator 80 is constituted by a communication control card such as a local area network (LAN) card. The communicator 80 transmits/receives various data to/from an external apparatus, such as a personal computer, connected to a communication network such as a LAN or a wide area network (WAN).

[Image Defect Detection Process]

The controller 100 of the image forming apparatus 1 executes the image defect detection process at predetermined timing such as timing when image formation of a predetermined number of sheets is performed according to a job, for example.

As shown in FIG. 1, the exposure device 411, the developing device 412, and the charging device 414 are arranged around the photosensitive drum 413 in parallel with the photosensitive drum 413. Next, as described above, the charging device 414, the exposure device 411, and the developing device 412 perform charging, exposure, and development, respectively, on the photosensitive drum 413. Therefore, in a case where there is an abnormality in the exposure device 411, the developing device 412, and the charging device 414, an image defect such as a streak mainly extending in the conveyance direction of the photosensitive drum 413, a so-called vertical streak, or the like appears in a portion of the toner image formed on the photosensitive drum 413, the portion corresponding to the abnormal part. The abnormality is, for example, contamination of the exposure device 411 or the charging device 414, clogging of the developing device 412, lubricant application unevenness of the photosensitive drum 413, or the like. The image defect detection process is for detecting image defects such as vertical streaks.

Figure 4:
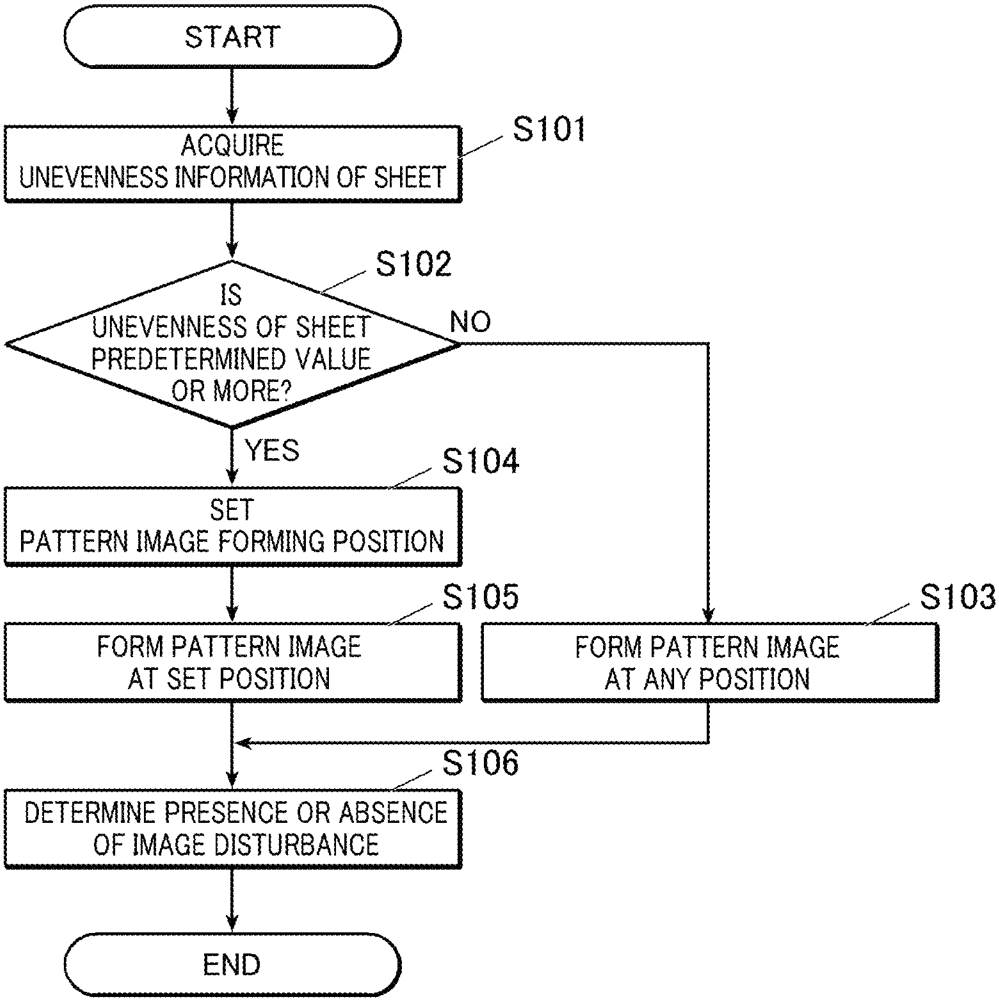
FIG. 4 is a flowchart of an image defect detection process.

FIG. 4 is a flowchart illustrating the flow of the image defect detection process. The image defect detection process is executed by cooperation of the controller 100 and the program stored in the storage section 70.

First, the controller 100 acquires the unevenness information of the sheet S (step S101). As described above, the controller 100 acquires the unevenness information of the sheet S from the measurement result of the sheet S by the profile sensor 54 which is the measurer.

The controller 100 determines, from the unevenness information of the sheet S, whether the sheet S has unevenness with the unevenness amount equal to or greater than a predetermined value that affects reading by the image scanner 55 (step S102). The predetermined value is, for example, 0.03 mm.

When the sheet S does not have unevenness with the unevenness amount equal to or more than the predetermined value (step S102; No), the controller 100 forms the pattern image at any position on the sheet S (step S103).

On the other hand, in a case where the unevenness of the unevenness amount equal to or greater than the predetermined value is present on the sheet S (step S102; Yes), the controller 100 sets a forming position of the pattern image which does not influence the reading of the image scanner 55 (step S104).

Figure 5A:
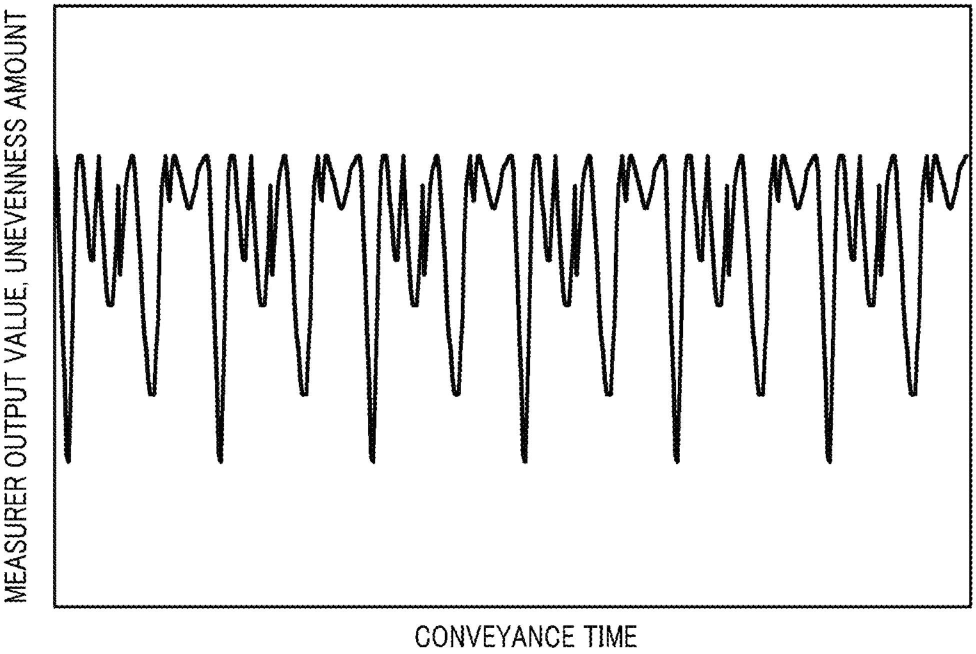
FIG. 5A is a graph related to an output value of the profile sensor.
Figure 5B:
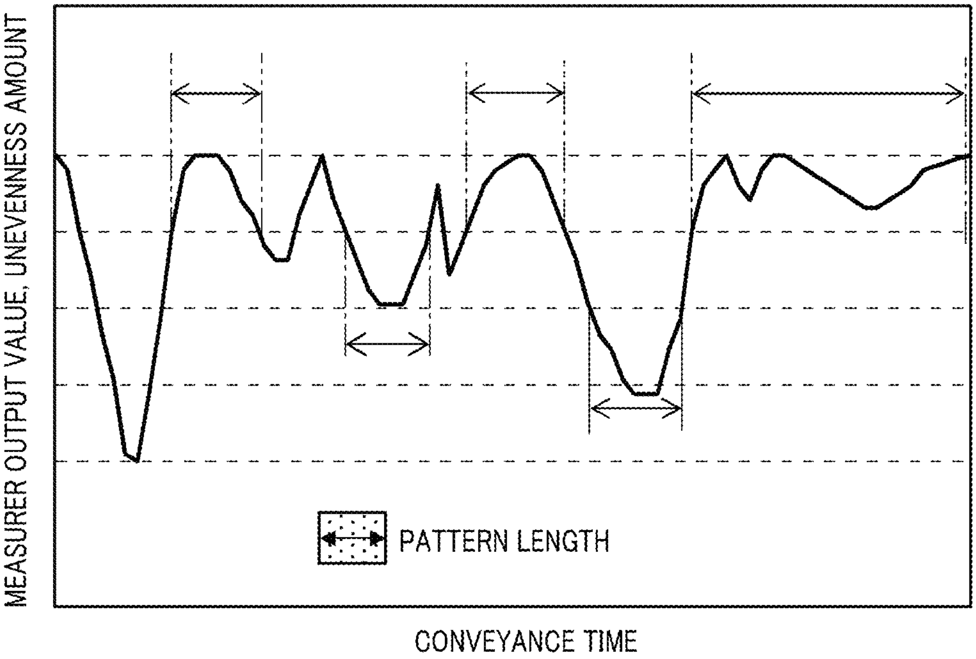
FIG. 5B is an enlarged view of a part of FIG. 5A.

FIG. 5A shows an example of a graph relating to the unevenness information of the sheet S. In FIG. 5A, the horizontal axis represents the conveyance time of the sheet S, and the vertical axis represents the unevenness amount of the sheet S. Here, it is assumed that the largest value of the unevenness amount of the sheet S is about 0.1 mm. At this time, as illustrated in FIG. 5B, the controller 100 divides the output value outputted by the profile sensor 54 into four in the height direction. Then, the height of each divided region is 0.025 mm, and if the pattern image can be formed in each divided region, it is within an allowable range of reading by the image scanner 55.

Note that in FIG. 5B, a range of each line type provided so as to sandwich a double-headed arrow indicates a region in each divided region where a pattern image can be formed in one divided region. In the FIG. 5B, since the sum total is the longest in the region of the two dot chain line, the controller 100 performs setting such that the pattern image is formed at a predetermined position in the region of the two dot chain line.

The controller 100 adjusts a pattern image forming operation of the image forming section 40 so as to form the pattern image at the position set in step S104 on the sheet S, to form the pattern image (step S105). As described above, the controller 100 functions as an adjuster that sets a pattern image forming position satisfying a predetermined condition based on the unevenness information and adjusts the operation of forming the pattern image by the image forming section 40.

After the formation of the pattern image in step S103 or step S105, the image scanner 55 reads the pattern image and transmits the read image to the controller 100. Next, the controller 100 determines the presence or absence of disturbance in image quality from the output value obtained from the read image and detects the presence or absence of the image defect (step S106).

Figure 6:
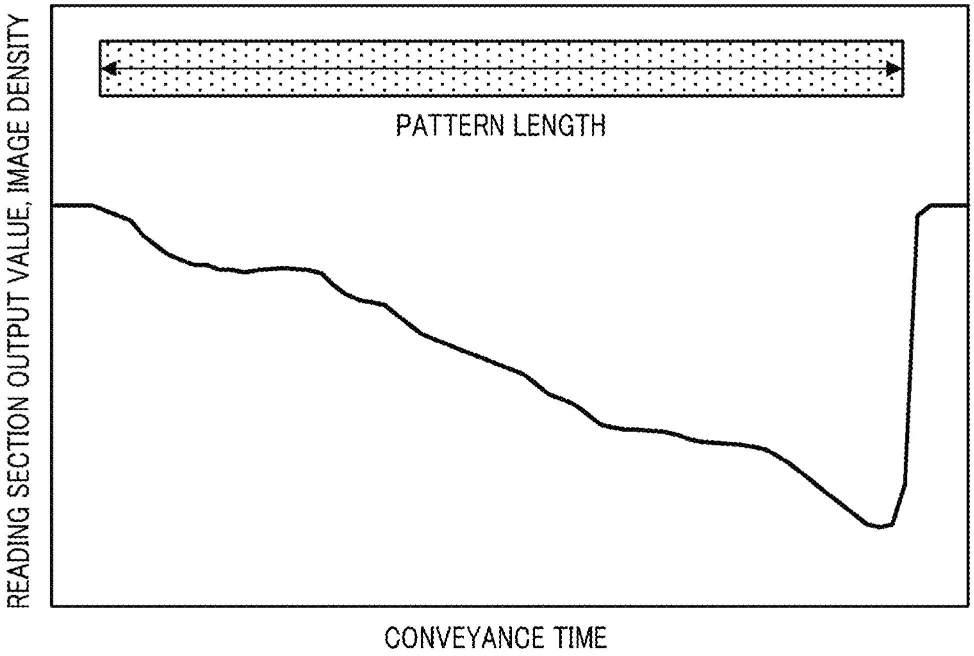
FIG. 6 is a graph relating to the output value of an image scanner that has read a pattern image formed in a two dot chain line part of FIG. 5B.
Figure 9A:
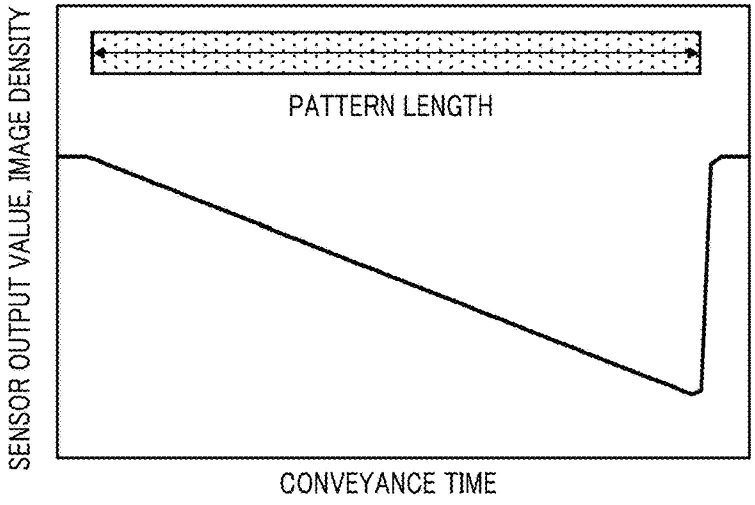
FIG. 9A is a graph relating to the output value of the profile sensor in a case where the pattern image is formed on a smooth sheet.
Figure 9B:
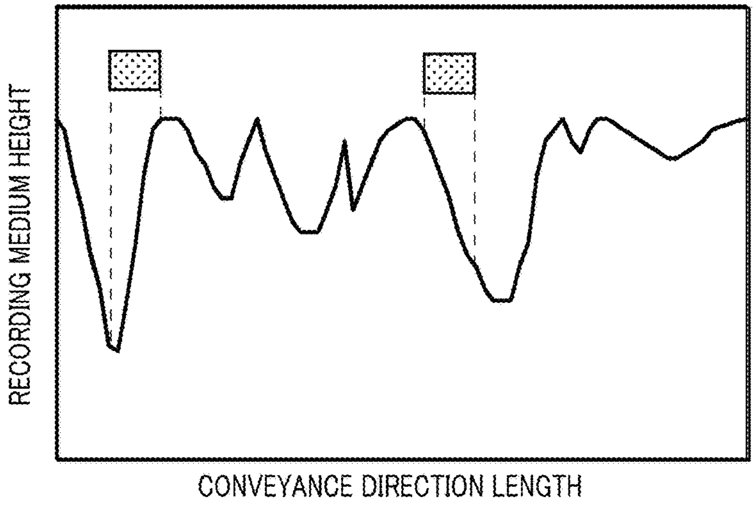
FIG. 9B is a graph illustrating a cross-sectional height of the embossed sheet.
Figure 9C:
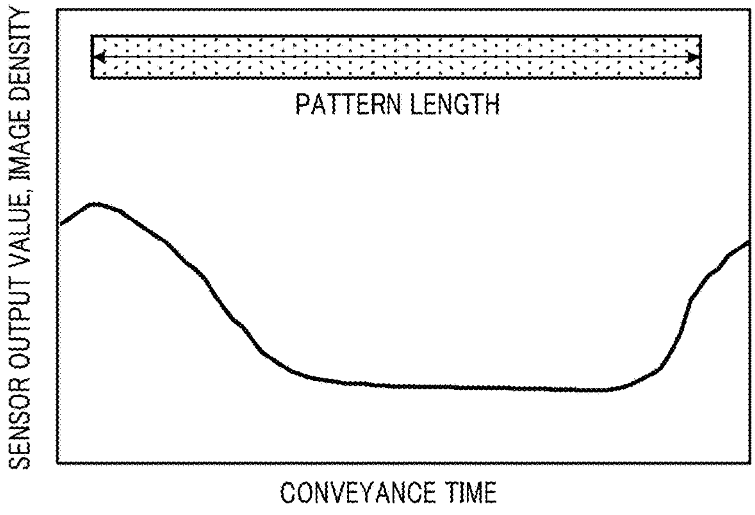
FIG. 9C is a graph related to the output value of the profile sensor when the pattern image is formed in an embossed portion of the embossed sheet.

FIG. 6 illustrates an example of a graph relating to the output value of the image scanner 55 obtained in a case of Step S102; Yes. Note that in FIG. 6, the horizontal axis represents the conveyance time and the vertical axis represents the output value. As can be seen from a comparison of FIG. 6 with FIG. 9A and FIG. 9C, according to the above configuration, even if the surface of the sheet S has unevenness with the unevenness amount that affects reading by the image scanner 55, a highly accurate output value substantially similar to that in the case of the smooth sheet is obtained.

When the image defect is detected in the image defect detection process, the controller 100 corrects the image defect by, for example, correcting the read image data based on the image defect. In this way, the controller 100 controls the image forming condition of the image forming section 40 to solve the image defect.

Effects of Embodiment

As described above, the image forming apparatus 1 according to the present embodiment includes the image forming section 40 for forming the image on the sheet S having unevenness on the surface thereof. The image forming apparatus 1 further includes an image scanner 55 that functions as a reading section to read a pattern image formed on the sheet S. Furthermore, the controller 100 of the image forming apparatus 1 functions as the acquirer that acquires the unevenness information regarding the amount of unevenness of the sheet S before the formation of the pattern image on the sheet S. The controller 100 of the image forming apparatus 1 functions as the adjuster that sets the pattern image forming position satisfying a predetermined condition based on the unevenness information and adjusts the forming operation of the pattern image. According to the above configuration, even if the sheet S has unevenness, the pattern image can be formed at a position where a variation in the reading result by the reading section is unlikely to occur, thus allowing more accurate pattern measurement.

In addition, in the image forming apparatus of the related art, disturbance occurs in the pattern image due to a failure such as fixing caused by embossing, and such disturbance may also cause variation in the reading result by the reading section. However, with the image forming apparatus 1 according to the present embodiment, the pattern image can be formed at a position with little height shift due to embossing. Therefore, a failure in pattern measurement due to the disturbance of the pattern image can also be suppressed.

Other Configurations

Although the present invention has been described in detail based on the embodiment, the present invention is not limited to the above-described embodiment. Of course, various modifications are possible within the scope of the invention described in the claims and their equivalents.

For example, although the case of forming the pattern image in detection of image defect has been described above as an example, it is not limited thereto. During execution of the image formation processing, the state of the image forming section 40 changes sequentially. The state of the image forming section 40 that changes includes, for example, an environment such as temperature and humidity, a charge amount of the developer in the developing device 412, and sensitivity of the photosensitive drum 413. Then, density characteristics change in accordance with such a state change of the image forming section 40. Therefore, the controller 100 forms and measures the pattern image for density measurement on the sheet S, so as to perform, at a predetermined frequency, control for feedback to the density adjustment of the formed image. The present invention is also applicable to the case of forming the pattern image in such density measurement.

Furthermore, in the description above, the pattern image is formed at any position on the sheet S when the sheet S does not have unevenness with the unevenness amount greater than or equal to the predetermined value, but it is not limited thereto. That is, the pattern image may be formed on the region having a smaller unevenness amount on the basis of the measurement result of the profile sensor 54.

In the above description, the configuration in which the output value of the profile sensor 54 is divided into four is exemplified, but the present invention is not limited thereto. For example, when the maximum value of the unevenness amount on the sheet S is 0.15 mm, the height of each divided region becomes equal to or smaller than the predetermined value (0.03 mm) by dividing the output value outputted from the profile sensor 54 into five. In this way, the number of divisions of the output value of the profile sensor 54 may be appropriately set according to the unevenness amount of the sheet S, the allowable range of reading of the image scanner 55, and the like. Note that as the number of divisions increases, the height of each divided region decreases correspondingly, and therefore, the reading result of the image scanner 55 becomes more stable. On the other hand, when the number of divisions is increased, the length of each divided region in the conveyance direction becomes relatively narrow, and thus the region in which the pattern image can be formed is reduced.

Furthermore, although the case where the sheet S is the cut sheet has been exemplified above, the present invention is not limited to this. The sheet S may be a long sheet or a roll sheet. In this case, the sheet S is contained in, for example, a sheet feed device connected to the image forming apparatus 1. Then, the sheet S held by the sheet feed device is supplied from the sheet feed device to the image forming apparatus 1 via a predetermined sheet feeding port, and is sent out to the conveyance path section 53.

Figure 7:
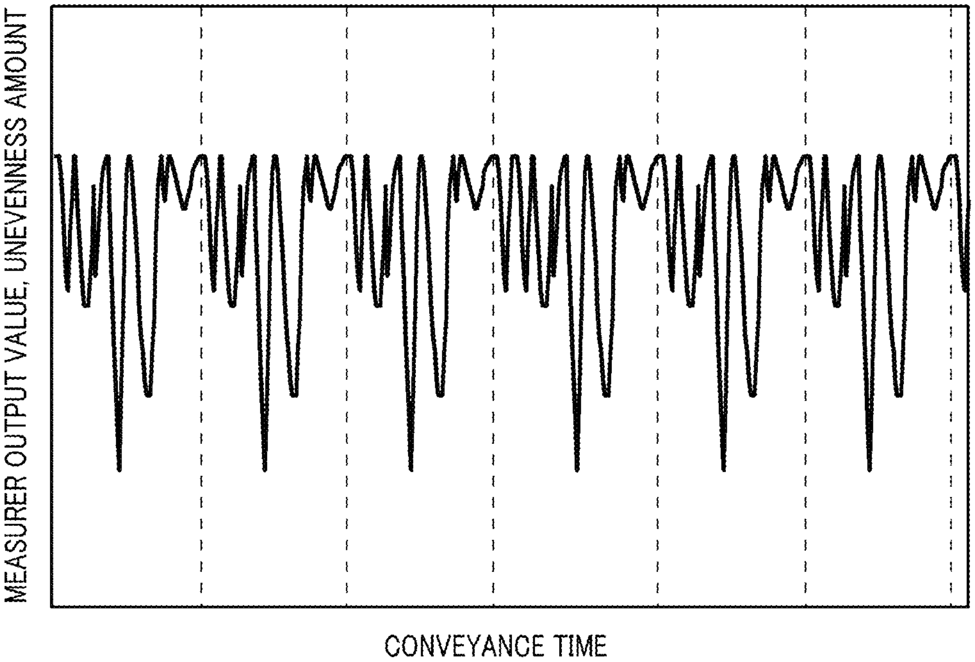
FIG. 7 is a graph relating to the output value of the profile sensor for a roll-shaped sheet having unevenness.

FIG. 7 illustrates an example of a graph of the output value of the profile sensor 54 for the roll-shaped sheet S. In FIG. 7, the horizontal axis represents the conveyance time, and the vertical axis represents the unevenness amount. As illustrated by the dotted line in FIG. 7, embossments in a predetermined pattern are periodically provided on the roll-shaped sheet S. Therefore, when the sheet S is in the form of a roll, the controller 100 may obtain the output value from the profile sensor 54 at any position as long as its periodicity can be confirmed. Therefore, when the sheet S is in the form of a roll, the profile sensor 54 may be provided at a position where L1<L2 is satisfied, and with the above-described configuration, the widthwise length of the image forming apparatus 1 in the conveyance direction can be reduced. Furthermore, when the sheet S is in the form of a roll, the controller 100 may reduce the control load by ending the measurement by the profile sensor 54 at the time point when the periodicity of embossing can be confirmed.

Furthermore, when the sheet S is in the form of a roll, stable reading results can be obtained even if patterns are formed at the same timing in a plurality of cycles. However, in practice, due to manufacturing error or the like, there may be variations in the unevenness amount, the shape, and the like even between corresponding embossments. Therefore, also on such a sheet S, similarly to the above, it is preferable to form a pattern at a position where reading by the image scanner 55 is stable.

Figure 8:
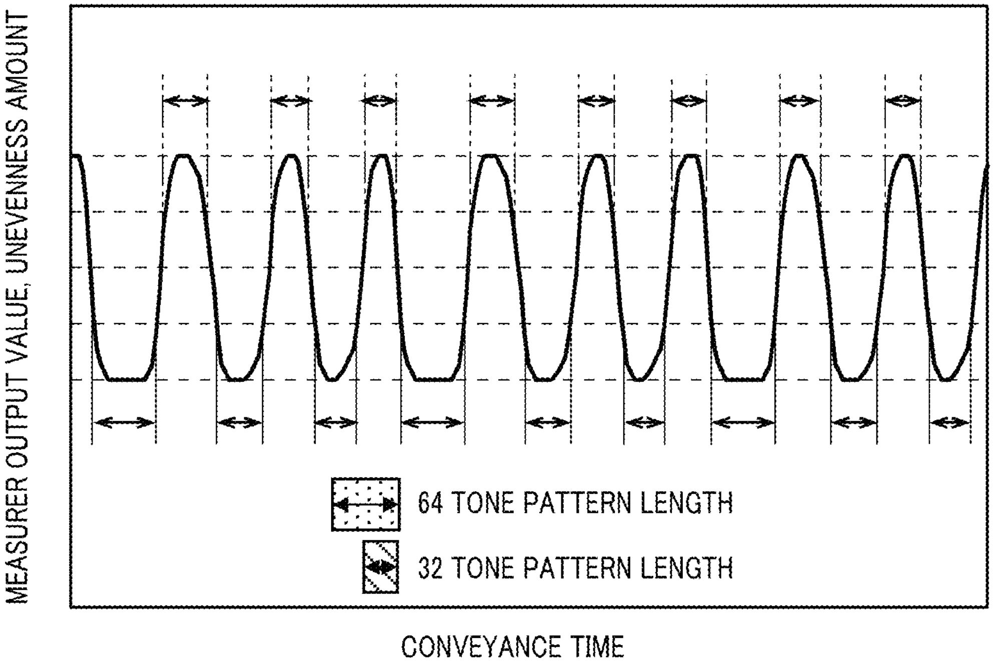
FIG. 8 is a graph relating to the output value of the profile sensor for a sheet on which the pattern image does not fit.

Furthermore, FIG. 5B illustrates the case where the pattern image can be formed in one divided region, but as illustrated in FIG. 8, the pattern image cannot be formed in one divided region in some cases. In such a case, the pattern image may be formed in one divided region by decreasing the tone of the pattern image from, for example, 64 tones to 32 tones to narrow the width length. This is because, as illustrated in FIG. 8, it is difficult to form a high-quality image on the sheet S having extremely large number of recesses and projections, and formation of a high-tone pattern image is unnecessary.

In addition, in the above description, the configuration in which the profile sensor 54 is used as the measurer is exemplified, but the invention is not limited thereto. The measurer is not limited to the profile sensor 54 as long as it can measure the unevenness of the surface of the sheet S, and another transmission type optical sensor or the like can also be used.

In the above description, the configuration in which the controller 100 acquires the unevenness information by measuring the unevenness of the sheet S with the profile sensor 54 provided in the image forming apparatus 1 has been exemplified, but the present invention is not limited thereto. For example, the sheet S may be conveyed by an apparatus separate from the image forming apparatus 1, and the unevenness of the sheet S may be measured by the measurer provided in the apparatus. In this case, the controller 100 acquires the unevenness information by the unevenness information being input from the separate device via the communicator 80.

Furthermore, the acquired unevenness information of the roll-shaped sheet S may be stored in the storage section 70. Then, in a case where the sheet S having similar unevenness is used again or the like, the unevenness information may be selected by the operation of the operation/display part 20 and the controller 100 may acquire the unevenness information.

Although a hard disk, a semiconductor nonvolatile memory, or the like is used in the above description as a computer-readable medium storing the program according to the present invention, the present invention is not limited to this. As another computer-readable medium, a portable storage medium such as a CD-ROM can be applied. Furthermore, a carrier wave is also applied as a medium for providing data of the program according to the present invention via a communication line.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-218826, filed on Dec. 26, 2023, including description, claims, drawings and abstract is incorporated herein by reference.

What is claimed is:

1. An image forming apparatus comprising:
- an image former that forms an image on a recording medium that includes unevenness on a surface thereof;
- a reader that reads a pattern image formed on the recording medium by the image former; and
- a hardware processor,
- wherein the hardware processor acquires, before formation of the pattern image on the recording medium, unevenness information regarding an amount and a position of unevenness on an image forming surface of the recording medium, and
- wherein, based on the unevenness information, the hardware processor sets a pattern image forming position satisfying a predetermined condition, and adjusts an operation of forming the pattern image performed by the image former.

2. The image forming apparatus according to claim 1, wherein the hardware processor controls an image forming condition in accordance with a reading result of the pattern image read by the reader.

3. The image forming apparatus according to claim 1, further comprising a measurer that measures the unevenness,
- wherein the hardware processor acquires the unevenness information from the measurer.

4. The image forming apparatus according to claim 1, further comprising a communicator that can communicate with another device and/or a storage in which the unevenness information is stored,
- wherein the hardware processor acquires the unevenness information from the communicator or the storage.

5. The image forming apparatus according to claim 1, wherein the hardware processor determines whether a predetermined portion of the recording medium satisfies the predetermined condition.

6. The image forming apparatus according to claim 1, wherein the hardware processor adjusts an operation of forming the pattern image by the image former in accordance with a size of the pattern image.

7. The image forming apparatus according to claim 1, wherein the hardware processor performs an adjustment that changes a size of the pattern image formed by the image former according to the unevenness information.

8. The image forming apparatus according to claim 3, wherein the measurer is provided at a position at which the hardware processor can reflect the unevenness information in the operation of forming the pattern image by the image former.

9. The image forming apparatus according to claim 1,
- wherein the recording medium is a continuous sheet including an embossed surface, and
- wherein the unevenness information includes an embossing cycle in a conveyance direction of the recording medium.

10. The image forming apparatus according to claim 9, wherein the hardware processor ends acquisition of the unevenness information at a time point when the embossing cycle is acquired.

11. The image forming apparatus according to claim 1, wherein the measurer includes an optical sensor with a light emitting section, polarizing plates that divide light reflected from the recording medium into a P wave and an S wave, a light receiver for the P wave, and another light receiver for the S wave.

12. The image forming apparatus according to claim 11, wherein the P wave corresponds to a specular reflection component of the light reflected from the recording medium and the S wave corresponds to diffuse reflection component of the light reflected from the recording medium.

13. The image forming apparatus according to claim 11, wherein the unevenness information is determined based on a ratio of the amount of received P wave and amount of received S wave.

14. An image forming method performed in an image forming apparatus including, an image former that forms an image on a recording medium that includes unevenness on a surface thereof, and a reader that reads a pattern image formed on the recording medium by the image former, the image forming method comprising:
- acquiring, before formation of the pattern image on the recording medium, unevenness information including an amount and a position of unevenness on an image forming surface of the recording medium; and
- based on the unevenness information, setting a pattern image forming position satisfying a predetermined condition, and adjusting an operation of forming the pattern image performed by the image former.

15. A non-transitory computer-readable storage medium storing a program that causes a computer of an image forming apparatus including an image former that forms an image on a recording medium that includes unevenness on a surface thereof, and a reader that reads a pattern image formed on the recording medium by the image former to perform:
- acquiring, before formation of the pattern image on the recording medium, unevenness information including an amount and a position of unevenness on an image forming surface of the recording medium; and
- based on the unevenness information, setting a pattern image forming position satisfying a predetermined condition, and adjusting an operation of forming the pattern image performed by the image former.

* * * * *